F. LOUVRIER.
ELECTROMETALLURGICAL FURNACE.
APPLICATION FILED NOV. 23, 1908.
978,464.
Patented Dec. 13, 1910.
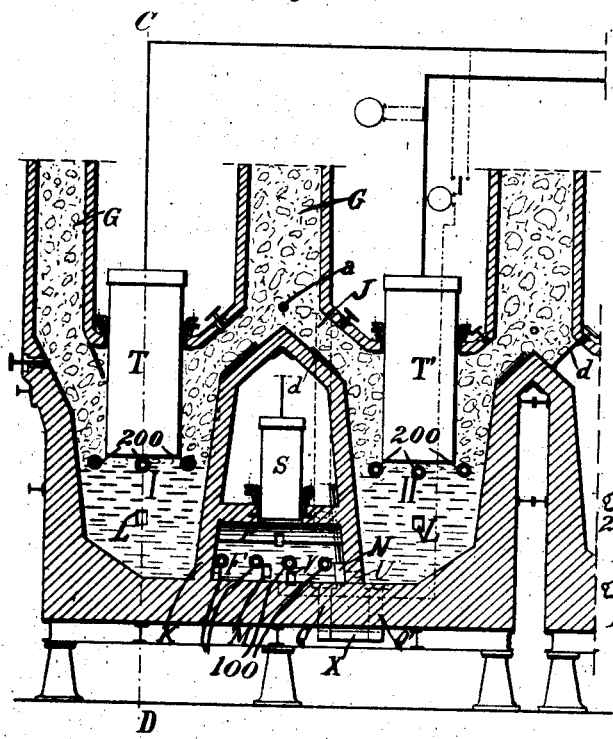
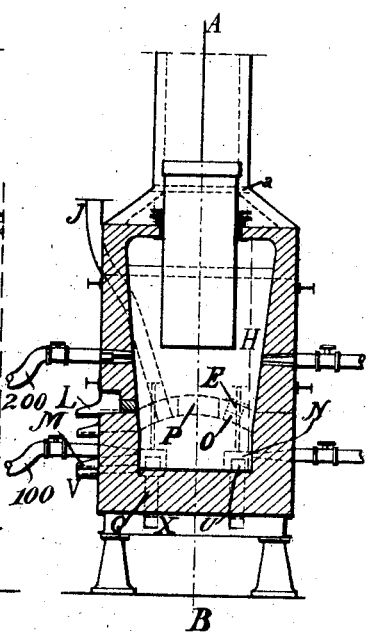
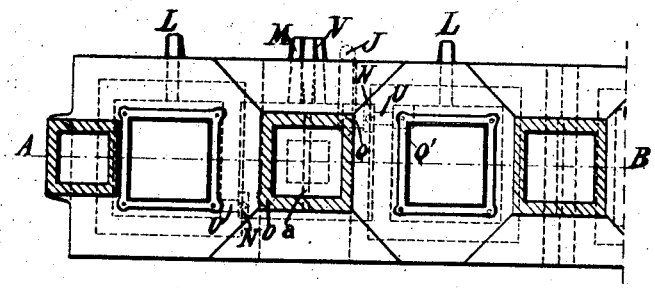
WITNESSES:
FRANÇOIS LOUVRIER
INVENTOR
BY
ATTORNEYS

UNITED STATES PATENT OFFICE.

FRANÇOIS LOUVRIER, OF MEXICO, MEXICO.

ELECTROMETALLURGICAL FURNACE.

978,464.

Specification of Letters Patent.   Patented Dec. 13, 1910.

Application filed November 23, 1908.   Serial No. 464,081.

*To all whom it may concern:*

Be it known that I, FRANÇOIS LOUVRIER, a citizen of France, residing at 3ª Ramon Guzman, 146, in the city of Mexico, Mexico, have invented certain new and useful Improvements in Electrometallurgical Furnaces; and I do hereby declare that the following is a full, clear, and exact description of the invention, such as will enable others skilled in the art to which it appertains to make and use the same.

The invention to be hereinafter described relates to metallurgical furnaces, and more particularly to the general class of such furnaces making use of the electric reduction processes.

Broadly speaking, the invention comprises a furnace body divided into reduction and refining or crucible chambers, communicating passages between the chambers, means for passing an electric current through the charge in the chambers when the communicating passages are open, slides for closing the passages, means for conducting the current from the refining to the reduction chambers when the passages are closed, means for burning, in the charging columns, the gases produced within the reduction chambers, or for discharging such gases into the atmosphere, or for collecting them, means for delivering air, under pressure, to the crucible chamber, and means for delivering from the crucible chamber the gases developed therein.

In order to enable one skilled in the art to which the invention relates to more clearly understand the construction, operation and use of the invention, reference should be had to the accompanying drawings forming part of the present application.

Throughout the several figures of the drawings, like reference characters designate the same parts.

In the drawings: Figure 1 is a vertical longitudinal section of a furnace on line A—B of Fig. 2; Fig. 2 is a vertical cross section on line C—D of Fig. 1; and, Fig. 3 is a plan view of Fig. 1.

The furnace body, as a whole, is constructed of suitable refractory material, and formed into two contracted reduction chambers I and II, both of which communicate with a crucible chamber F, by way of the openings U, which openings may be closed by the slides or gates N, operable from the exterior of the furnace.

In order to heat the charge in the furnace to a reducing temperature, electrodes T and T' are passed through the roof of the furnace, and project into the reduction chambers I and II respectively. It will be noted that the crucible chamber is disposed between the two reducing chambers I and II. Consequently, the current will flow in through the electrode T, through the charge in the reduction chamber I, through the refined metal in the crucible chamber F, through the charge in the reduction chamber II and out through the electrode T', melting the charge, in its circuit.

Each furnace is provided with a plurality of charging columns G, through which ore may be fed to the interior of the furnace, and these columns have each a rod or rods $a$ extending transversely across the lower end of the column in such position as to protect the construction from violent shocks caused by the fall of the ore, while feeding. The furnaces, of course, are arranged in batteries in order to save space and to afford a more economical construction. In this manner, every second column G will serve as a partial feeder for two reduction chambers, as shown in Fig. 1. The gates $d$ may be brought to play in order to discontinue the feed in one of the furnaces while the others are in operation. These gates may be operated by hand wheels from the exterior of the furnace, or in any other manner desired.

The portion immediately above the crucible chamber F, lying between the inner walls of the reduction chambers I and II, constitutes an open space, easy of access and terminating in a tapered pointed roof, by means of which the charge from the central column G is led toward either side and into the reduction chambers, whose lowest part is the dome shaped partition P forming the upper part of the crucible chamber F. This dome is provided with a plurality of openings O, through which refining materials may be introduced. These openings may all be tightly closed by refractory lids or covers E. Besides these openings for introduction of refining materials, there may be a larger and centrally disposed opening for the insertion of the supplementary electrode S, if desired, which may be used intermittently whenever the metal in the refining chamber becomes cool during the passage of the normal current. Of course, when the openings U are closed by the slides N, the passage of the current from the metal in the crucible chamber to that in the reduction chamber II is interrupted. In order to bridge the closures N, wall plugs Q and Q' are let into the bottom of the furnace and extend into the crucible and reduction chambers II respectively, their outer ends being connected together by a conductor X. The passages for all of the electrodes are made tight by hermetic closures.

In many instances the process will require the injection of air under pressure. In such cases, any usual form of twyers 100 may be used communicating with the interior of the crucible chamber. Of course, when the compressed air is introduced, there must be some means provided for the escape of the gases generated. To this end, a flue J may be connected to the top of the chamber in such manner as to deliver all vapors to the outside air. The reduction chambers and the refining or crucible chamber are provided respectively with spouts L and M, for withdrawal of slag and metal.

The entire furnace is constructed throughout from highly refractory electric insulating material, which will not enter into combination with or act chemically on the material being treated or that resulting from the process. It is particularly desirable that carbon shall not enter into the composition of the floors or soles of the furnace.

The spout M, previously mentioned, is situated just a few millimeters above the floor or sole of the furnace, so that a very thin surface layer of the metal will be left in the furnace to insure conduction of the electric current. An additional spout V is provided for the complete withdrawal of all metal. This spout is placed directly on a level with or slightly below the sole of the furnace.

The several electrodes are, of course, so mounted that they may be inserted or withdrawn as desired in order to vary the effect of the electric current on the ore being treated. When the gases from the reduction chambers are to be burned in the charging columns, twyers 200 will be provided in the bases of the columns for feeding air thereto, and the passages around the electrodes will be hermetically closed. Suitable meters of well known form may be used in order to determine the amount, the tension and consequent consumption of the current.

It is thought that the operation and use of the invention will be clear from the preceding detailed description.

Changes may be made in the details of the construction, arrangement and disposition of the several parts of the furnace, without in any way departing from the field and scope of the invention, and it is meant to include all such within this application, wherein only a preferred form has been shown and described.

Having thus fully described my invention, what I claim as new, and desire to secure by Letters Patent, is:—

1. A furnace of the character described, comprising a furnace body, a refining chamber built up within the furnace body in such manner as to divide the interior of the furnace body into two separate and distinct reduction chambers and provided with openings through the lower parts of its walls to allow flow of reduced metal directly from the bottoms of the reducing chambers to the interior of the refining chamber, means for passing a reducing current through the material in the furnace, means for feeding material to the reduction chambers, and means for cutting off the flow of reduced material from the reduction chambers to the refining chamber.

2. A furnace of the character described, comprising a furnace body, a refining chamber built up within the furnace body in such manner as to divide the interior of the furnace body into two separate and distinct chambers and provided with openings through the lower parts of its walls to allow flow of reduced metal directly from the bottoms of the reducing chambers to the interior of the refining chamber, means for passing a reducing current through the material in said reduction and refining chambers while the passages in said refining chambers are open, means for closing said openings, and means for bridging said closures so that the electric current may pass thereabout.

In witness whereof I have hereunto set my hand in the presence of two witnesses.

FRANCOIS LOUVRIER.

Witnesses:
ANDREW DEKENS,
J. G. MIJAUS.